Dec. 13, 1960 P. MOLLA 2,964,077
AUTOMATIC CONTINUOUS MACHINE FOR MANUFACTURING
THREAD-LIKE SHANK MATCHES
Filed Oct. 4, 1955 11 Sheets-Sheet 1
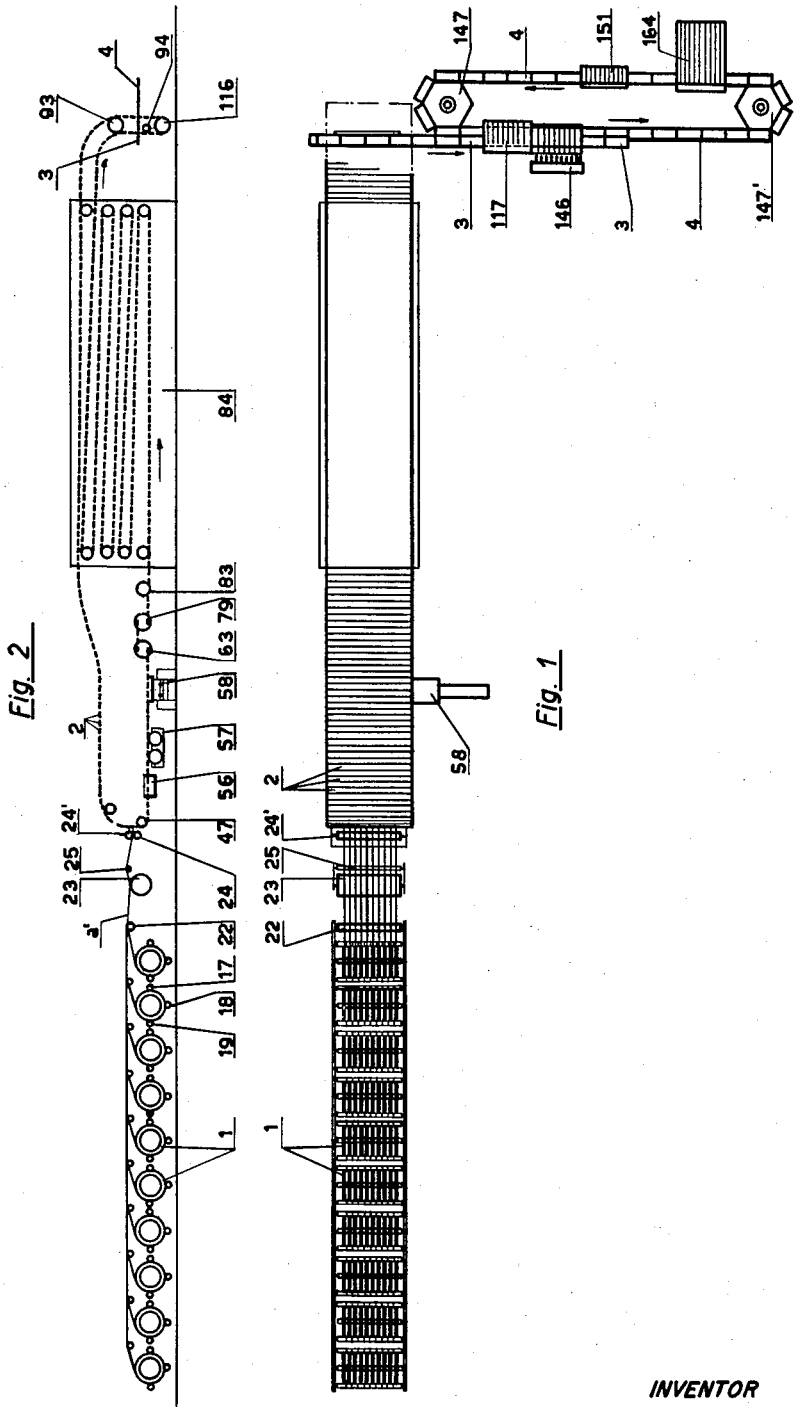
INVENTOR
PIETRO MOLLA
BY Robert H. Jacob
AGENT

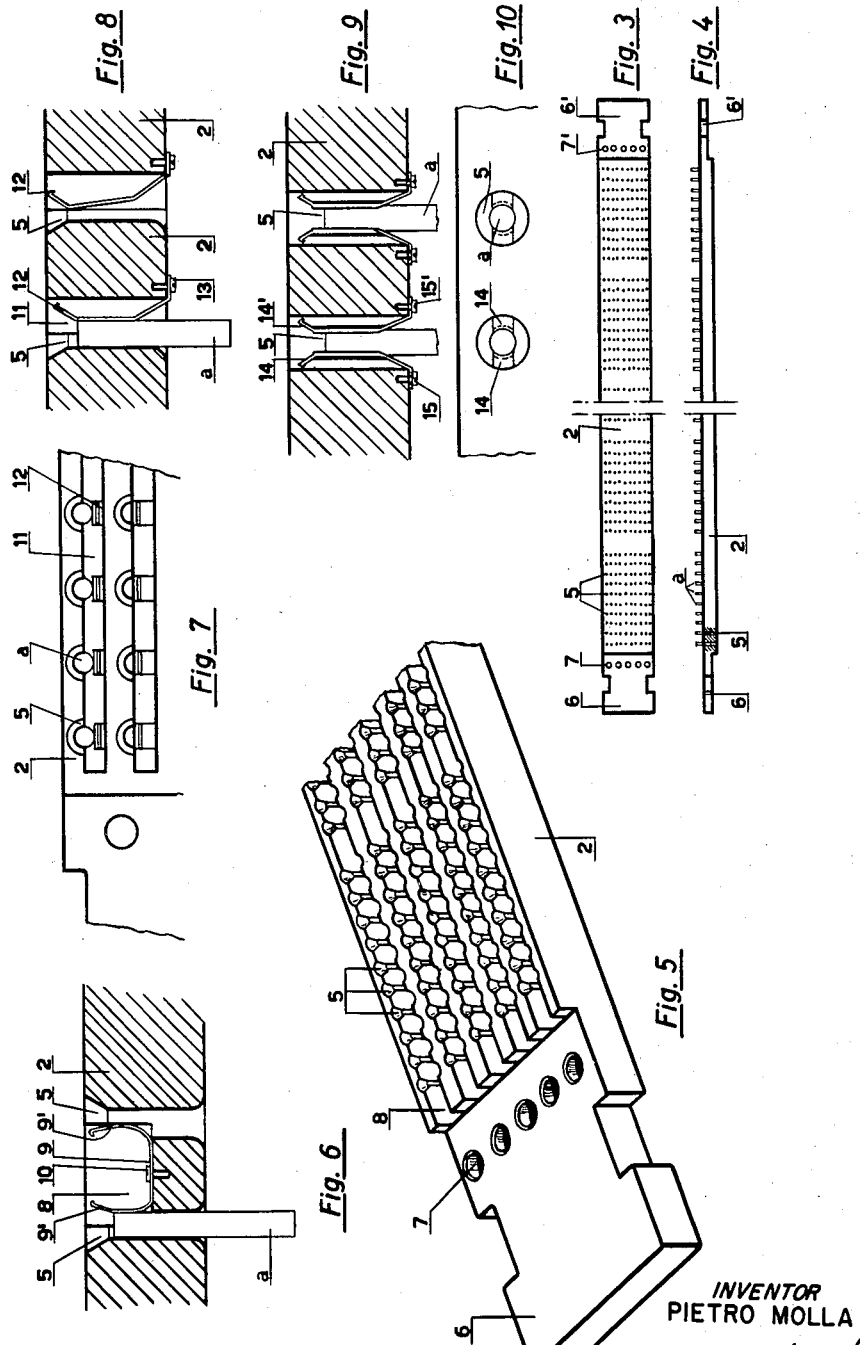

Fig. 12
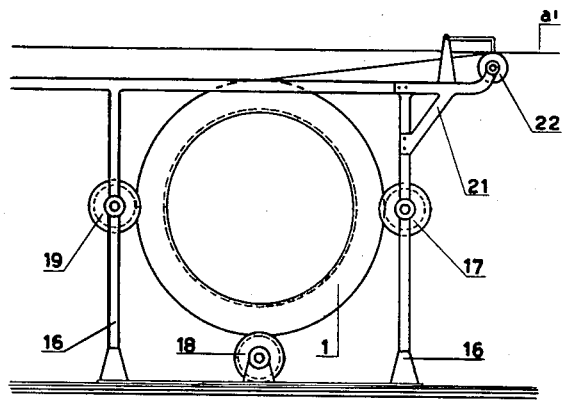
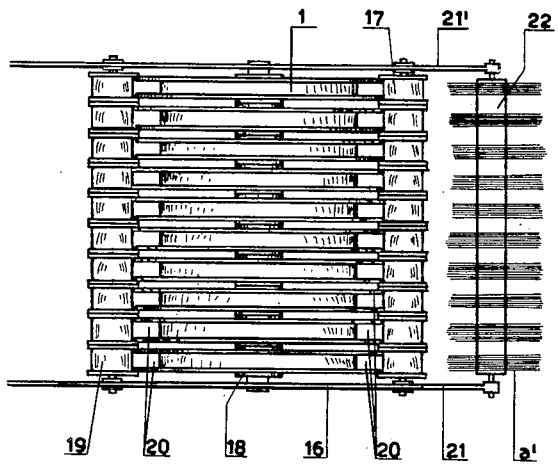
Fig. 11

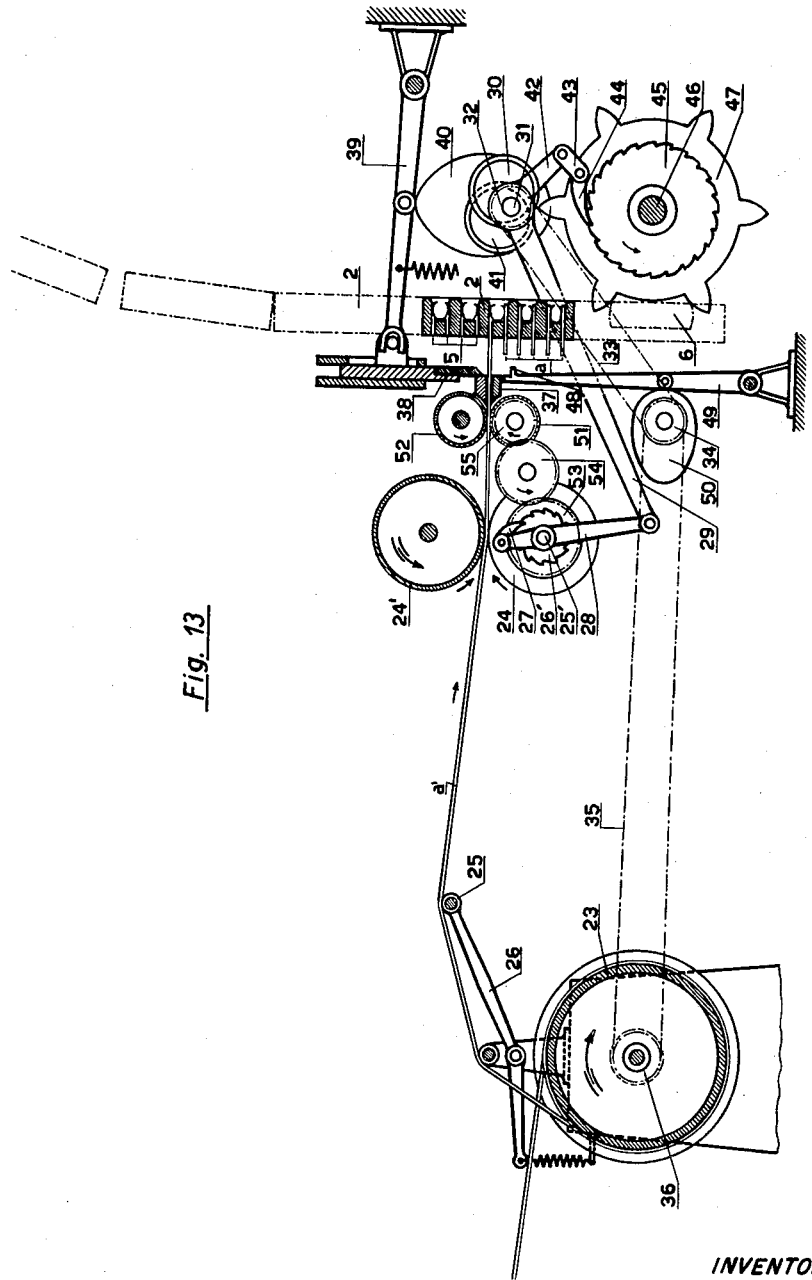

INVENTOR
PIETRO MOLLA

Dec. 13, 1960 P. MOLLA 2,964,077
AUTOMATIC CONTINUOUS MACHINE FOR MANUFACTURING
THREAD-LIKE SHANK MATCHES
Filed Oct. 4, 1955 11 Sheets-Sheet 8

INVENTOR
PIETRO MOLLA
BY Robert H. Jacob
AGENT

Dec. 13, 1960
P. MOLLA
2,964,077
AUTOMATIC CONTINUOUS MACHINE FOR MANUFACTURING
THREAD-LIKE SHANK MATCHES
Filed Oct. 4, 1955
11 Sheets-Sheet 9

INVENTOR
PIETRO MOLLA
BY
AGENT

Dec. 13, 1960 P. MOLLA 2,964,077
AUTOMATIC CONTINUOUS MACHINE FOR MANUFACTURING
THREAD-LIKE SHANK MATCHES
Filed Oct. 4, 1955 11 Sheets-Sheet 11

INVENTOR
PIETRO MOLLA
BY Robert H. Jacob
AGENT

United States Patent Office 2,964,077
Patented Dec. 13, 1960

2,964,077
AUTOMATIC CONTINUOUS MACHINE FOR MANUFACTURING THREAD-LIKE SHANK MATCHES

Pietro Molla, Pontenuovo di Magenta, Italy, assignor to S.A.F.F.A. S.p.A. Fabbriche Fiammiferi ed Affini, Milan, Italy, a company of Italy Filed Oct. 4, 1955, Ser. No. 538,470

Claims priority, application Italy Oct. 14, 1954

8 Claims. (Cl. 144—51)

This invention relates to an automatic continuous machine for manufacturing matches which, starting from a thread or cabled thread of what is generally paper or cotton which has been paraffin waxed and is wound on special feed drums or rollers, produces automatically matches with a thread-like shank, boxes them in a predetermined number and delivers the closed boxes, if required with revenue stamps or other seals attached, in an orderly manner.

By the term "matches with a thread-like shank" are intended those matches whose shank is obtained by cutting a continuous thread or cabled-thread in small segments of suitable length. Such types of matches are for example, those whose shanks are obtained from one or more cotton threads which have been treated with stearine and drawn, or from a strip of paper, wound or twisted on itself and then treated with paraffin wax and subsequently drawn or from any other material in thread form having physical characteristics which are suitable for this purpose, such as specially treated plastic or other material. In particular reference is made to the common type of matches which are known commercially as "wax matches." For the sake of brevity the waxed shank will be referred to hereinafter as the thread for making the shanks of the described matches.

It is generally known to those skilled in this art that for manufacturing wax matches machines are provided which carry out, separately, the following operations:

Framing, that is the cutting of the waxed thread wound in previously prepared coils in small segments making up the match shanks and their insertion into special frames which are made up of a given number of wood sticks which are lined with cloth and held together by means of a peripheral frame. The shanks are automatically arranged in predetermined numbers and uniformly spaced from one another between the successive wood sticks in the frame so as to form rows of shanks all having equal projection from the rack by the amount necessary to carry out the following heading operation.

Heading, that is the simultaneous immersion of a small portion of all the shanks carried by a frame into the paste constituting the mixture for the heads, after the shank tips have been eventually brushed and wet in order to assist the adherence of the mixture.

Drying, generally carried out by placing trolleys loaded with the headed frames into hot air drying chambers.

Framing off and boxing, that is unloading the shanks from the frames and placing them in predetermined numbers into their boxes. This operation is carried out by machines of various types and conceptions, in some of which the frames are loaded vertically and in some, horizontally. These operations of unframing and boxing are still, today, done by hand in many factories, requiring much hand labour.

The main disadvantage of the working cycle which is carried out by these machines, or manually, is the discontinuity of the operations, discontinuity due to the substantial difficulties which render impracticable the use of the above mentioned frames on a standard machine which would carry out all the above mentioned operations.

Another disadvantage comes from the necessity of using a large number of match holding frames and trolleys for carrying the frames from the framing stage to the heading stage, from this stage to the drying stage and then to the unframing and boxing stage. As a result a large area has to be available for arranging the frames and trolleys and much hand labour has to be employed for operating the machines, for the hand operations, and for the movement of the frames and trolleys from one stage to another.

The machine according to this invention, being a machine which carries out all the above described operations in a continuous manner, radically eliminates the above mentioned disadvantages, making possible a high production rate in a comparatively small space and with a minimum employment of labour.

More particularly, the machine according to the invention is characterized in that it comprises, in succession, a given number of individual drums or rollers for feeding the waxed thread, an uncoiler drum or roller, feed drums or rollers for the waxed thread, a continuous succession of shank holder blocks forming an endless conveyor, a device for cutting the thread fed from the uncoiler drum into predetermined lengths and for loading the cut shanks into the blocks, a power driven endless conveyor for actuating the blocks, a bath for wetting the tips of the shanks before heading them, a brush type device for removing excess water, a heading device, a turn-over device for the blocks, a drying chamber and a device for removing the matches from the blocks, all being placed, from the cutting device to the removal device inclusive, along the path of the endless conveyor, and a conveyor chain for the finished matches and a conveyor chain for the boxes, mutually co-operating for boxing the matches.

The special match holder block used on the machine has the same function as the frames of the conventional non-continuous method and not only makes possible the continuity of the operations from framing to unframing, but allows a greater precision in the carrying out of the operations and also in the subsequent boxing operation, with advantages which can be measured in terms of a better product, less scrap and reasonable accuracy in the number of matches contained in the boxes.

Another peculiar characteristic of the machine according to this invention is the method of uncoiling the waxed threads which are used to make the shanks of the matches. In the conventional framing machines the waxed threads are fed to the machine from a pair of multi-partition drums on which, by means of projecting teeth or other means, divisions are provided in each of which a given amount of coupled threads is wound. This method requires an additional operation during the stage of drawing the waxed thread for rewinding it in the various partitions of the drum and it causes frequent and obvious breakdowns, during the framing, when the thread in one partition breaks. Further, as the actual length of the threads wound in the various partitions is never exactly the same, it is necessary, if it is desired, to have the same number of matches contained in each box when boxing them, to provide for replacing the drums as soon as a thread in one partition is finished.

In the machine according to this invention use is made of a given number of individual drums, which are independent of one another, and so shaped as to be easily changeable on the uncoiling unit at all times, without interferring with the other drums.

Other novel features of the claimed machine comprise a system for feeding the thread through the machine, cutting it to desired lengths, thrusting it into the holes of the blocks, turning the blocks over during match forming operation, unloading the finished matches and boxing them.

Objects and advantages other than those set forth will be apparent from the following description when read in connection with the accompanying drawings in which:

Fig. 1 is a diagrammatic showing of the whole of the machine seen in plan view;

Fig. 2 is a diagrammatic showing of the whole of the machine seen in side elevation;

Fig. 3 is a partial diagrammatic view of a match holder block as seen in plan view;

Fig. 4 is a partial diagrammatic view of a match holder block as seen from one side;

Fig. 5 is a perspective view of a part of a match holder block according to one embodiment, without the shank gripping springs;

Fig. 6 is an enlarged portion of a block according to the embodiment in Fig. 5, as seen in cross section, showing the shank gripping springs;

Fig. 7 shows a plan view of a portion of a match holder block according to another embodiment;

Fig. 8 is an enlarged portion of a block according to the embodiment in Fig. 7, as seen in cross section, showing the shank gripping springs;

Fig. 9 is an enlarged portion of a block according to a further embodiment, as seen in cross section, showing the shank gripping springs;

Fig. 10 is a plan view of a hole in a block according to the embodiment shown in Fig. 9;

Fig. 11 is a plan view of a group of individual drums for the feed of the waxed thread from which the shanks are cut;

Fig. 12 is a view in elevation of the group of drums shown in Fig. 11;

Fig. 13 is a diagrammatic view in elevation, partially in section, of the mechanism for the feed and cutting of the waxed thread and for the loading of the shanks into the blocks;

Fig. 19a is an enlarged detail view of the conveyor chain carrying the boxes, as shown in the Fig. 19;

Figure 14:
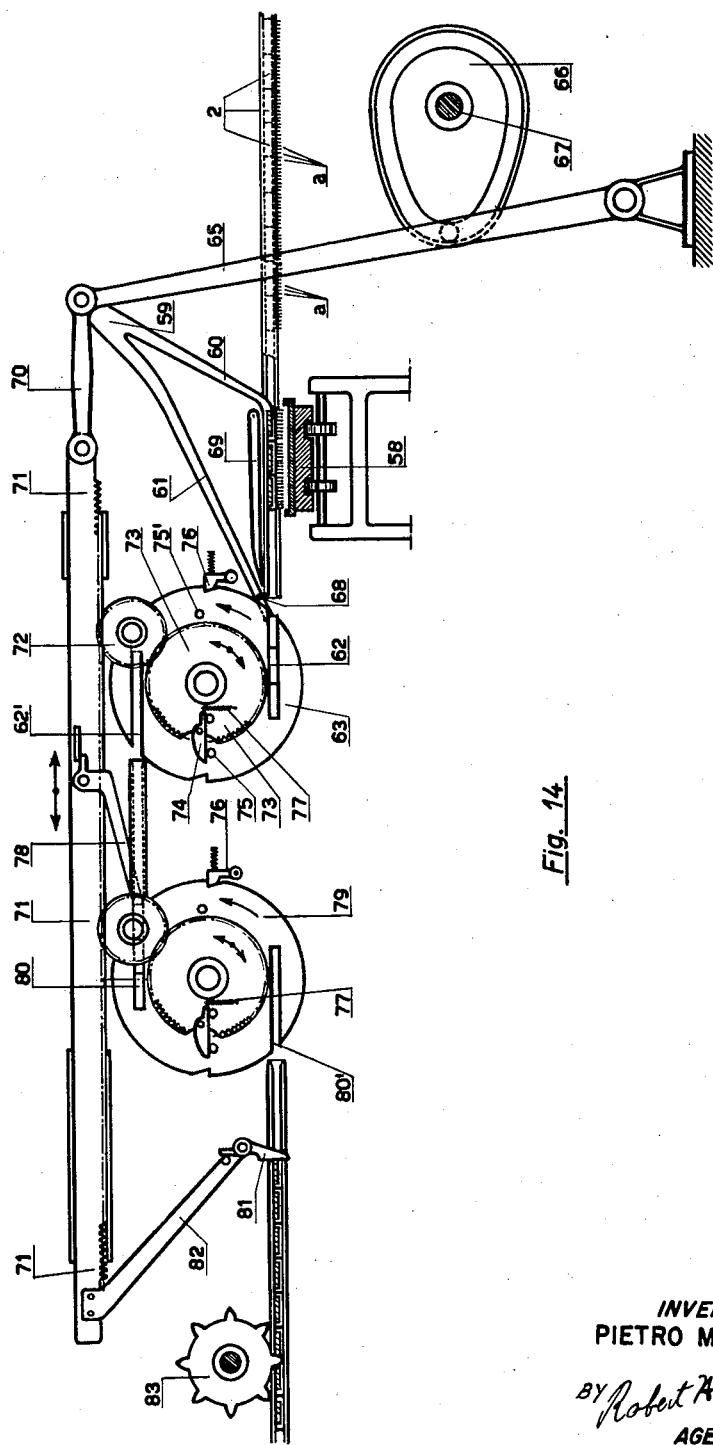
Fig. 14 is a diagrammatic view in elevation, seen in section, of the mechanism for the feed of the shank holder blocks to the heading stage and for the momentary turnover of the blocks as soon as the shanks are headed.

The machine, as a whole, can be, generally speaking, sub-divided into three main parts, namely:

Feed system of the waxed threads for preparation of the shanks;

Treatment of the shanks for preparation of finished matches; and

Boxing or encasing of the finished matches in predetermined quantities.

The first part (Figs. 1 and 2) is characterized by the use of individual supply drums 1 for the feeding, each of which carries a single continuous coil of waxed thread.

The second part is characterized by the continuous succession of drilled blocks 2 mounted on a power driven endless conveyor for carrying the shanks through the various operational stages until they are discharged as finished matches.

The third part is characterized by the working together of the two continuous chains 3 and 4, the first for the feed of the finished matches in orderly groups of pre-determined number, and the second for the movement of the boxes which, being fed forwards empty and closed, are returned filled, closed and eventually sealed.

The central part, in which the drilled block 2 constitutes the basic element, is in close connection with the other two parts. In fact, as will be later better shown, the number and the placing of the feed drums 1 as well as the make up of the chain links 3 and 4 depend on the number and placing of the holes in the block 2.

For that reason, before starting with a progressive illustration of the machine in its functions, a description of the shank holder blocks 2 will be made.

The shank holder blocks 2, whilst solving advantageously the same problems of the frames in the conventional non-continuous methods, that is the task of bringing the shanks through the various stages which lead up to the delivery of finished matches ready for boxing, differs substantially from these, in that it is made up of a metallic block or of other suitable material in which the shanks can be easily inserted and firmly held without the need of having to enclose in a frame the movable parts which hold the shangs firm. For this reason and due to the ease of handling, it has been possible to obtain the continuity of the operations on the machine according to this invention.

The holding firm of the shanks of waxed thread in the holes is obtained in the block according to the invention by spring loaded auxiliary devices which are built into the holes of the holder block. The springs when assembled and placed in the holes allow an easy insertion of a part of the shank into the hole (bevelled edge to hole) without meeting excessive friction (since the nature of the shank will not allow a strong thrust-in action to be exerted). The insertion of the shank between a spring and a wall as shown in Figs. 6 and 8, or between two springs as shown in Fig. 9, firmly holds the shank so that the shank is able to resist such forces as are encountered during the working phases.

During this description some types of spring loaded systems will be described, as used on holder blocks for gripping the shanks, but it is evident that such means can be thought of in a great variety of forms without, however, departing from the scope of this invention.

The shank holder block 2 (Figs. 2 and 4) is made up from a rectangular bar in which are drilled the holes 5 for the insertion of the shanks a. The number and arrangement of these holes 5, having a diameter slightly larger than that of the shanks, can vary at will and depends on the power of the machine and the number of matches to be placed in each finished box.

In the embodiment illustrated, having an assumed production of 10 boxes, each box containing 100 matches for each holder block, the holes 5 are arranged in ten longitudinal rows, in which each row is sub-divided into ten groups of ten holes. The distance between the longitudinal rows of holes 5 is constant and the distance of the first and the last row from the edges of the holder block is exactly a half of the distance between row and row.

T shaped end extensions 6 and 6' are provided for resting the holder block 2 on side guides and for feeding it by means of driving sprockets according to systems which are well known.

The holes 7 and 7' are provided for lining up the holder block 2, at the moment of inserting the shanks and discharging the matches.

The portion of the holder block 2 which has the match holding holes 5 has a depth somewhat greater than the thickness of the end portions 6—6', the purpose being to have the holes 5 sufficiently deep to hold a substantial length of the shanks a.

For the firm holding of the shanks a, according to a preferred embodiment, between each pair of rows of holes 5 (Fig. 5) in the upper part of the holder block 2 a longitudinal groove 8 is provided. This groove cuts in half the holes 5 of each pair of rows. In each groove 8 and at each pair of opposite holes 5 (Fig. 6) a small spring 9 is set which is fixed to the bottom of the groove 8 by means of a screw 10.

The spring 9 is shaped in such a way that the free ends 9', when in the rest position, press against the flat vertical walls of the groove which cut in half two opposite holes 5 at the point where the spring 9 is arranged. Each hole 5 has a portion which is a complete circular cross-section in the lower part of the block into which the shank a can enter without any appreciable forcing and a portion with a semi-circular cross-section defined by the spring blade 9' into which the shank a, once entered, is firmly held due to the effect of the spring 9'.

To assist the entry of the shanks into the holes 5, the latter have been suitably bevelled on the lower side (loading side of the holder block 2). Similarly, to assist the entry of the discharge pushers, which will be later described, the holes 5 are bevelled also at the upper part with a semi circular cross-section. For the same reason, also the ends 9' of the spring 9 are shaped so as to complement the bevelling of the holes 5 in the semi-circular cross-section portion.

According to a further embodiment illustrated in Fig. 7, a thin longitudinal slot 11 is machined through each group of holes 5 longitudinally of block 2. Slots 11 subdivide rows of holes 5 throughout their depth (that is over the whole thickness) of the block 2. Within the slot 11 and at each of the holes 5 (Fig. 8) a suitably shaped plate spring 12 is arranged which is fixed to the body of the holder block 2 by a screw 13. The plate spring 12 in this case passes right through the whole depth of the holder block 2. On the loading side the plate spring 12 is sharply bent away from the axis of the hole so as not to obstruct the insertion of the shank a. Throughout substantially the length of the hole the spring adheres to the vertical wall of the slot 11 thereby forming a gripping zone on the shank which is defined by a fixed part of the semi-circular wall of the hole 5 and the straight portion of spring blade 12. The free end of spring 12 is flared outwardly from the axis of the hole so as not to obstruct the entry of a discharge pusher hereinafter described.

The two embodiments described allow for the gripping of the shank between a fixed part (semicircular wall of the holes 5) and a spring element (plate spring 9 or 11).

A third embodiment arranges for the gripping of the shanks in the holes 5 by means of two spring elements. In this case (Fig. 9) the holes 5 are of a somewhat greater diameter than the shanks, enough to allow the fitting of two plate springs 14 and 14' therein and to be secured to the body of the holder block 2 by means of the screws 15 and 15' respectively.

The plate springs 14 and 14' pass through the entire depth of the holder block 2 and, similarly to the already described, plate spring 12, they are shaped in such a manner that the first section thereof, near to the loading side, is sharply bent so as to allow easy entry of the shank a. The upper section, however, which has to effect the gripping action, is in the form of a straight groove (Fig. 10) so as to better follow the curvature of the shank cross-section. Further the upper end is, as usual, shaped to allow easy entry of the ejector pusher for the machine.

The number of holder blocks 2 used on the machine, independently of their embodiment, is in relation to the length of the travel between the loading point and discharge point through the dryer and back to the loading point (Fig. 2). The continuous succession of holder blocks 2, normally advances through the system with a uniform speed, except during some stages (loading, discharge and heading) where the feed is an intermittent motion, as will be better illustrated during this description.

The feed of the waxed threads to the loading point on the holder blocks 2 is simultaneous with the uncoiling from the thread holder drums 1 (Figs. 1 and 2). The number of drums 1 must be equal to the total number of holes 5 on a longitudinal line of the holder blocks 2, since each drum 1 supplies the thread for only one hole of the holder blocks 2. In the case illustrated, having 100 holes on each longitudinal row, the number of drums needed is also 100.

The arrangement of the drums 1 in the uncoiling stage can vary at will, however, it is desirable to arrange them, for better control of the threads, in as many groups as there are groups of holes in the shank holder blocks 2. In the case illustrated, since every thread for 100 holes is sub-divided into groups of 10 holes, the drums 1 also are arranged in 10 groups of 10 units (Fig. 1).

Each of these groups (Fig. 11) comprises a suitable framework 16 on which are mounted, for each drum 1 (Fig. 12), the three small idle rollers 17, 18, 19 on which the drums 1 are simply rested so as to rotate freely.

One advantage of this structure is that drum 1 is mounted on the framework 16 without the need of a central shaft on which to rotate. This facilitates considerably the replacement of the empty drums with full drums. Furthermore, since the drum 1 is essentially made up of a ring having a channel cross-section whose groove 20 is sufficiently large and deep to take a large amount of waxed thread, it operates for a relatively long period of time before replacement.

On the head of the framework of the first group of drums 1 (Figs. 11 and 12) a pair of spaced brackets 21—21' are mounted for supporting therebetween a collector roller 22 over which the waxed threads a pass. Threads a are grouped in 10 sets of 10 threads, each set being formed of threads coming from a succession of 10 drums arranged in the 10 groups of drums. Obviously, each set of 10 threads feeds a group of 10 holes on one longitudinal row of holes in the shank holder block.

The feed of the waxed threads a' (Fig. 2), occurs simultaneously by means of tension from the uncoiler drum 23, around which are made to pass all of the threads. Drums 1 carrying the threads rotate on the idle supporting rollers 17, 18 and 19.

The drum 23 has a continuous feed motion. Since the cutting of the waxed threads a and the loading of the shank holder blocks requires an intermittent thread feed (Fig. 13), this is done by a pair of feed rollers 24—24' which are mounted in front of the loading point of the shank holder blocks. To this end, the waxed threads a', in the section between the uncoiler drum 23 with a continuous movement, and the tension rollers 24—24' which have an intermittent motion, are controlled by the idle roller 25, mounted on a pair of spring loaded arms 26. Arms 26 compensate for the continuous variations in the length of the threads thereby maintaining a continual tension.

The rollers 24—24' make the waxed thread a' advance with an intermittent motion for a section corresponding to the length of a shank a. This movement is obtained from the driven roller 24 which is fixedly mounted on shaft 25' for rotation therewith. Sprocket 26' fixedly mounted on shaft 25' for rotation therewith receives the impulses necessary for the forward feed of threads *a* through a pawl 27 mounted in cooperating relationship with sprocket 26'; a rocker lever 28 mounted idle on the shaft 25', and a connector link 29 which is in connecting relationship with an eccentric 30 keyed to the transmission shaft 31. Off this same shaft 31 is driven the uncoiler drum 23 through a chain gear 32, the chain 33, the double chain gear 34, the chain 35, and the chain gear 36, in such a manner that the amount of continuous feed of the thread *a'* due to the action of the drum 23, at each jerk forwards created by the roller 24, corresponds to the length of a shank *a*.

In order to aid thread advancement, the idle roller 24' is coated with rubber and the driven roller 24 is formed of metal grooved so as to operate as a thread guide.

Each of the threads *a'*, after passing over a thread guide plate 37 which is grooved identically to the spacing of the holes of a row of holes in the shank holder block and rollers 24—24', enters a hole 5 of a longitudinal row of 100 holes in a block 2. At this time, and exactly in the interval between one feed forward and the next one of the roller 24, that is whilst the threads *a'* are stopped, the guillotine blade 38, due to the action of the lever 39 and cam 40 mounted on the shaft 31, lowers itself thereby cutting from threads *a'* a given number of shanks *a*.

The shank holder block then advances a position, bringing in front of the thread guide plate 37 another row of 5 empty holes. The feed of the holder block 2 in this working stage is freed from the continuous feed movement which normally advances the holder blocks 2 through the machine and comes under, for timing reasons, the drive of the shaft 31. An eccentric 41 keyed on shaft 31 in combination with the lever system 42—43 and a pawl 44 connected thereto as shown in Fig. 13 acts intermittently on ratchet wheel 45 which is mounted on the shaft 46. A pair of specially cut sprockets 47 keyed to the shaft 46, penetrate into the empty spaces existing between the T-shaped ends 6 and 6' on the holder blocks 2 and effect the forward movement of blocks 2 in jerks for a distance equal to the spacing between two longitudinal rows of holes.

With this forward movement of the holder block 2 the shanks *a*, cut by the blade 38, are brought into line with the shank pusher bar 48. Bar 48 being fixed to the lever 49 which is driven by the grooved cam 50 which in its turn is driven by the shaft 31 through chain gears 32 and 34 and the chain 33, enters rythmically into action pushing on the ends of the shanks *a* until they are deep into the holes 5 in the holder block 2 and are firmly held by the spring grip devices. The amount of insertion of the shanks into the holes 5 is adjusted so as to leave a portion of the shank projecting on the loading side long enough to allow the carrying out of the subsequent heading operations.

The waxed thread used for this type of match is well known to have little rigidity and in order to assist their forward movement and also to use the thread to the last piece when a coil comes to an end, another pair of feed rollers 51—52 through which the threads are made to pass is mounted adjacent guide bar 37. The driven roller 51 is rubber coated and the idle roller 52 is made of metal.

Since the feed of the threads *a'* in this region is intermittent, the roller 51 is driven with an intermittent movement directly off the roller 24 through the spur gears 53, 54 and 55. These gears are geared down so as to give the small roller 55 a peripheral speed which is equal to that of the roller 24.

The small rollers 51—52 being so close to the loaded holder block render almost negligible the number of empty holes due to lack of thread when a coil terminates, provided the operator has the presence of mind of timely introducing between the rollers 24 and 24' the terminal of a new coil.

From what has been described above about the loading of the holder blocks it is evident that the action of insertion of the shanks into the holes is sub-divided into two stages, namely the preliminary entry due to the thrust on the thread by the pairs of rollers 24—24' and 51—52 and then the deeper insertion due to the effect of the pusher bar 48. This action is necessary because the threads do not withstand the force of the above mentioned rollers required to force them between the gripping plate springs in the holder blocks. After the cutting off of the shank, it is easy to push the ends of the shanks by means of the shank pusher bar into holes 5.

The holder blocks loaded with shanks, advancing with an intermittent motion, are then made to pass (Fig. 2) through two operations which are preparatory to the heading operation. More particularly the shanks are advanced above the bath 56 where the tips of the shanks projecting from the block are wetted with hot water and then advanced above the rotating brushes 57 where drops of water which may be adhering to the tips of the shanks are removed.

Then the blocks are passed over the heading table 58 where the tips of the shanks are immersed in the heading mixture according to methods which are already well known.

The feed of the blocks through the heading phase (Fig. 14) is done by a pawl and ratchet system which, taking one or more holder blocks at a time from the continuous succession of blocks fed forward, moves them rapidly above the heading table. In the embodiment illustrated, the number of holder blocks 2 which are fed forward and headed simultaneously is three, but this number can be brought up to eight or more.

Immediately after the heading operation, the three holder blocks are turned over and held with the matches erect and upwards, for a short time, so as to allow the heads, which are still pasty to set and form.

The same ratchet system effecting the fast feed of the holder blocks to the heading table 58 is used also for the successive feed of the headed blocks of matches to the turn-over device. In effect the feed device is made up of a double ratchet 59 whose arm 60 moves the blocks to the heading stage and whose arm 61 takes off the blocks on their travel at the heading table 58 and pushes them into the groove 62 of the turn-over disc 63. Obviously, the devices 59 to 63 and the other devices illustrated in Fig. 14 which will be mentioned later are understood to operate on both ends of the holder blocks, that is at the T extensions 6—6' or in the empty spaces between these extensions 6—6' when two or more blocks are continuous.

The double ratchet 59 is pivoted at the end of the oscillating connector link 65 which is driven through the grooved cam 66 off the transmission shaft 67. During the return motion of the ratchet 59, the pin 68 projecting from a side of the ratchet arm 61 has to rub on top of the slide 69 due to which the pawl arms 60 and 61 are lifted and abandon their hold on the blocks 2. Having finished the return movement, the pin 68 passes under the slide 69, thereby positioning the ratchet arms 60 and 61 again in engagement position due to the feed forward of the next group of holder blocks 2.

On the end of the connector link 65 where the ratchet 59 is pivoted, a connector link 70 is also attached for the motion of the guided rack 71. The pinion 72 meshes simultaneously with the rack 71 and with the sprocket wheel 73 which is mounted idle on the pivot of the turn-over disc 63. The sprocket wheel 73 makes a rotary movement, that is, a half turn per time, either clockwise or counter clockwise according to whether the oscillating link 65 is moving backwards or forwards. When the sprocket wheel 73 rotates counter-clockwise due to the action of the ratchet 74 pressing against the pin 75, it drags with it the turn-over disc 63. When it turns clockwise however, the disc 63 remains stationary being held in position by the end of travel stop 76 whilst the ratchet 74 can freely pass over the pin 75', diametrically opposite to the pin 75, rotating around its own pivot and then returning into position due to the return spring 77.

In other words, when the link 65' rocks forwards, the three headed blocks are loaded into the groove 62 of the disc 63 and at the same time, due to the ratchet 78 secured to the rack bar 71, the three blocks housed in the groove 62' in the disc 63 in a position diametrically opposite to the groove 62 are pushed from the turn-over disc 63 to a similar turn-over disc 79 within the groove 80. When the link 75 returns, the disc 63 turns counterclockwise by half a turn causing the blocks housed in the groove 62 to be brought into position in the groove 62', that is, they are turned over, whilst the empty groove 62' returns to the position 62 to take a new load of blocks.

The disc 79 and the parts effecting its movement are identical to the disc 63, and at each forward oscillation of the link 65 the blocks are loaded into the groove 80, as already described, and at each oscillation backward taken by the lever 65 the blocks in the groove 80 are brought into the position at the groove 80', that is they are returned to their original position. At the next oscillation forward of the link 65, the ratchet 81 pivots on the arm 82 which in its turn is fixed to the rack bar 71, unloads the blocks from the disc 79 by pushing them out of the groove 80' and arranges them again on the path of the blocks where a sprocket 83 under continuous movement sends them under uniform motion (Fig. 2) into the drying chamber 84.

At the end of the travel into the drying chamber 84, the blocks are unloaded in such a way that the collection of the finished matches is done in an orderly manner in groups of a given number which is that required for a boxing operation. These conditions are attained, first because of the type of holder block used, which allows the discharge of the matches in rows in which the matches are already divided into groups, second because the collection of these groups of matches being the components of one or two rows is done in small separate cells which are mounted on or are an integral part of a discharge conveyor for the transfer of the matches to the boxing and third due to the presence of devices for alignment and arrangement of groups of discharged matches with the aim of easing their insertion into the boxes.

The discharge of the finished matches from the blocks occurs essentially by the simultaneous insertion of one or more rows of pushers having diameters about equal to the shanks into one or more longitudinal rows of holes on a block from the side opposite to the loading side of the block. The pushers push out the finished matches overcoming the resistance of the spring means gripping the shanks which are incorporated in the blocks.

In the embodiment illustrated (Fig. 15) the discharge of the matches $b$ occurs on two horizontal rows of matches simultaneously by means of the pressure bar 85 on which are secured two rows of pushers 86 spaced equally apart as are the rows of holes on the holder block 2. The match pusher bar 85 is mounted at its ends, on a pair of slides 87 which move in guides 88—88' due to the link system 89—90 which are driven by the grooved cam 91 mounted on the transmission shaft 92. The blocks 2, during this working stage, are made to advance with an intermittent motion by a distance corresponding to that between two alternate horizontal rows of holes 5. In effect the holder blocks coming from the drying chamber under continuous motion, are delivered by the sprocket 93 which is under continuous motion to the sprocket under intermittent motion 94. Thus, being driven off the transmission shaft 92 through a grooved cam 95, the oscillating link 97, the pawl 98 and the racket 99, makes the blocks advance by a distance equal to twice the distance between two rows of adjacent horizontal holes 5 in the interval between two consecutive forward movements of the match pusher bar 85.

Figure 16:
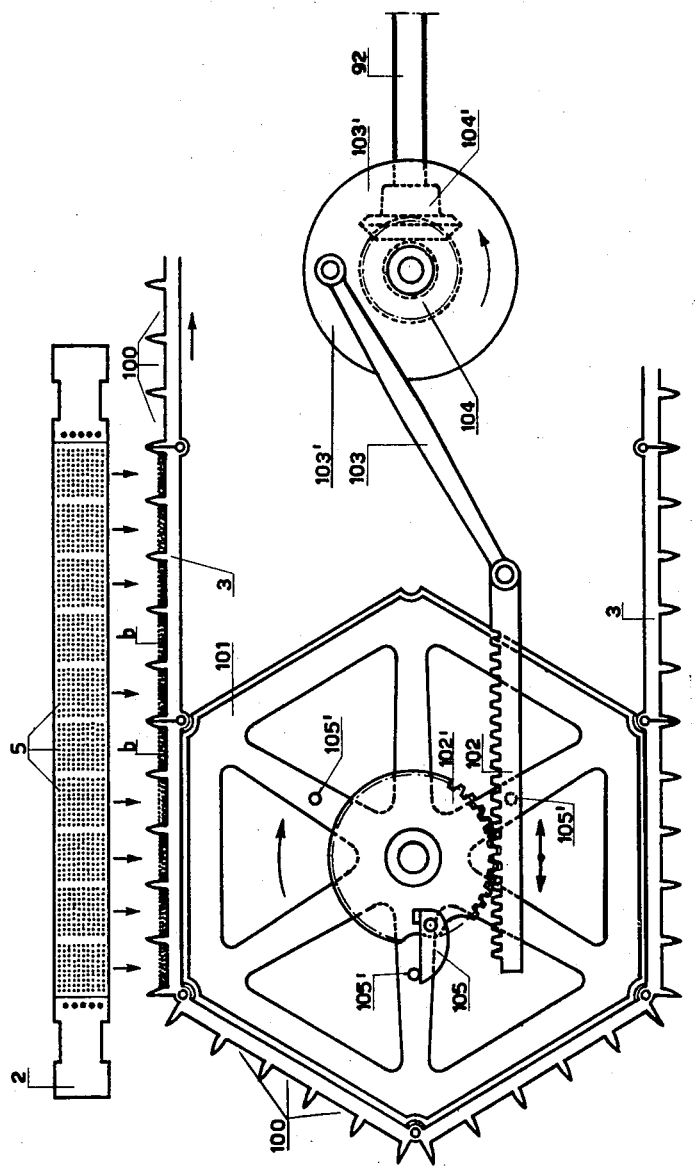
Fig. 16 is a diagrammatic view, as seen from the front, of the conveyor chain for the finished matches and of a shank holder block in the discharging position.

The aligning of the bar 85 with the block 2 so as to assure a perfect centering of the discharge pushers 86 with the holes 5 occurs at each stroke by means of special registering pins (not shown in the figure) which enter the holes 7 drilled at the ends of the blocks (Fig. 3). The grooved cams 91 and 95 are shaped in such a way that at each turn of the shaft 92, five feeds forward of the block 2 and hence five insertions of the pushers 86 into the holes in the holder block 2 are obtained, followed by a brief period of rest to allow, as will be illustrated hereinafter, the feed forward of the chain conveyor 3 for the finished matches. In effect, at the end of each five movements of the block 2 and hence five strokes of the discharge bar 85, the holder block 2 has completely discharged the matches $b$ and these (Fig. 16), being collected in the small cells 100 on the conveyor chain 3 in amounts of 20 (two groups of ten maches) per stroke, must be promptly removed by sending them to the boxing apparatus by means of the feed of the chain conveyor 3 along a section corresponding to the number of cells required for each discharge.

Obviously it is possible to vary the number of strokes of the discharge members discharging the finished matches from the holder blocks so as to vary the number of matches collected in the small cells 100 for boxes having different contents. If, for example, a content of 80 matches per box, is desired, the cams 91 and 95 should be shaped so that the rest period of the discharge members occurs every four strokes instead of every five.

The conveyor chain for the finished matches is made up of links each carrying one or more small cells to take the discharged matches, said cells being bounded by two lateral walls spaced so that each cell has a width equal to the space occupied by a single group of holes on each longitudinal row of holes of the holder blocks and such that the mutual spacing between the cells is equal to the mutual spacing between the groups of holes on the holder blocks.

The links of the conveyor chain 3 in the embodiment illustrated, comprise each five cells or divisions 100, but they could comprise a single cell or a different number thereof. Two links each having five cells collect the contents of matches from one holder block in an amount of ten groups of 100 matches each. After the five strokes of the discharge devices illustrated, and more particularly during the short rest period of the devices, the conveyor chain 3 advances a section equal to the length of two links in the direction of the boxing place and presents another two empty links for discharging a new holder block.

Figure 15:
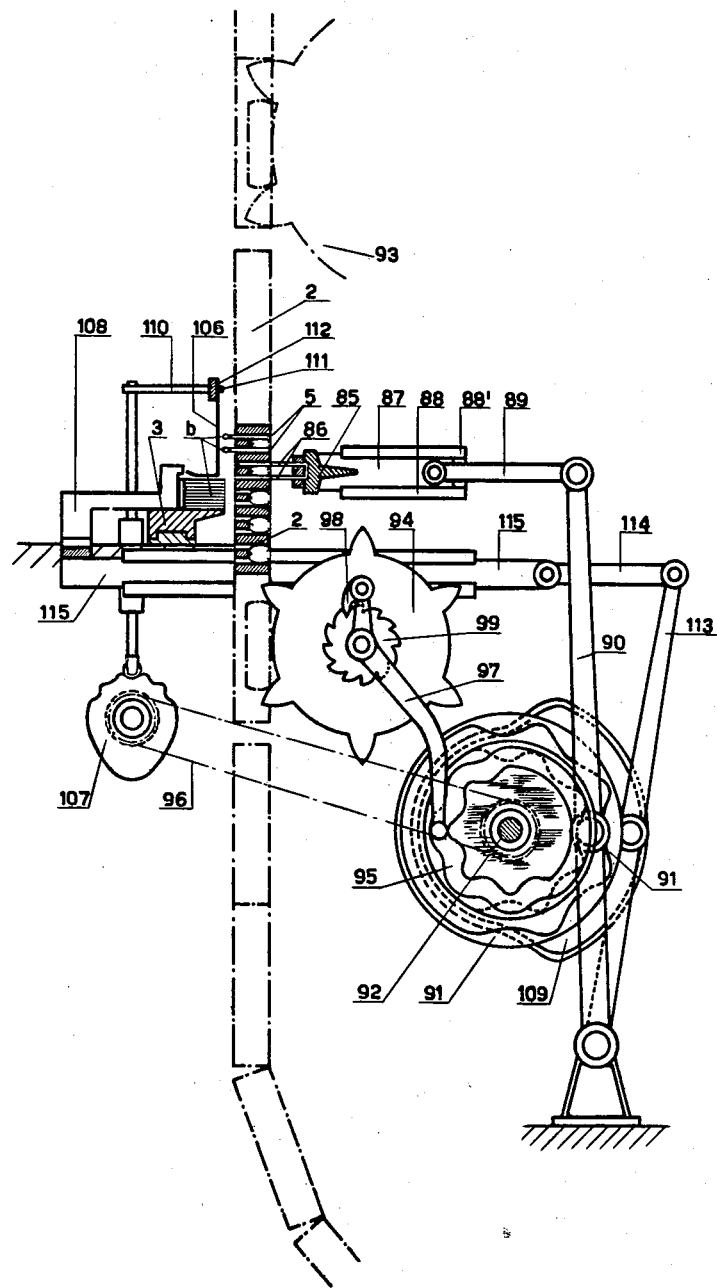
Fig. 15 is a diagrammatic view in elevation, partially in section, of the mechanisms which cooperate in the off-loading of the finished matches from the shank holder blocks.

The synchronizing of the feed of the chain 3 with respect to the holder blocks 2 during the discharge, is obtained because the driven hexagonal wheel 101, which gives the feed movement to the links of the chain 3 (Fig. 16), is driven off the same shaft 92 which effects the feed of the holder blocks by means of the sprocket 94 (Fig. 15). The intermittent drive of the wheel 101 (Fig. 16) is obtained from the rack 102—102' connected to the rod 103—103' which is in its turn connected by the bevel gears 104—104' to the driving shaft 92. During the forward movement of the rack 102, the pinion 102' which is mounted idle on the shaft of the wheel 101, due to the positive action of the pawl 105 on the stud 105', carries with it the hexagonal wheel 101 for a section equal to the feed forward of the two holder blocks. During the return movement of the rack 102 and thus of the pinion 102', the wheel 101 remains stationary due to the passive action of the pawl 105. Obviously, the movement of the rack 102 is adjusted so that it occurs at each turn of the shaft 92, at the time at which the holder block 2 and the match discharge bar 85 are at rest between one set of five strokes and the next set.

In order to assure a good arrangement of the matches $b$ which are in groups in the cells 100 at the moment of discharge (Fig. 15), the machine is fitted with a plurality of alignment brackets 106. Cams 107 driven through a chain 96 off the transmission shaft 92 cause brackets 106 to drop, in the intervals between each movement of the discharge pusher bar 85, into each of the ten cells 100 giving a light blow above the matches $b$ so as to align them horizontally. Each bracket 106 is made from a thin strip of suitable material bent at right angles in inverted L form and secured to a carrier arm 110 by means of screws 111 sliding in the slot 112, so as to allow the guide to be adjusted to the height of the small pile of matches $b$.

Obviously the cam 107 is shaped so as to allow the bracket 106, after it has dropped for five successive times on the matches during the discharging, to remain stationary in the raised position for a period which is equal to the period of rest of both the block 2 and the pusher discharge bar 85.

A further device for arranging the matches in the small cells 100 is made up of a plurality of punches 108, which have the same size as the cells 100. Punches 108 are suitably driven off the shaft 92 through the grooved cams 109, the links 113 and 114 and a carried slide 115 and enter for a short distance into the cells 100, from the front side, to maintain the alignment of the matches $b$ in a vertical direction during the unloading of the matches from the holder block 2. The cam 109 is shaped so as to cause, for every turn of the shaft 92, the entry of the punches 108 into the cells 100 and their remaining therein during that period in which the discharge pusher bar 85 carries out the discharge of the matches and the withdrawal of the punches 108 from the cells 100 and also the feed of links of the chain 3 carrying the small cells 100.

After the discharge of the matches, the empty blocks are made to take up again a continuous movement by the sprocket 116 which returns them towards the loading point (Fig. 2).

With the purpose of assuring the accuracy of the number of matches in each box, before the finished matches brought by the chain conveyor 3 (Fig. 1) reach the point where they are actually put into the boxes, it is possible to add automatically to each group of matches held in the cells 100 of the chain conveyor 3, one match to compensate for the rare loss of a match which may occur at the end of a coil of waxed thread. Since, normally, the holder blocks reach the discharge point 100% filled with matches, this apparatus normally does not work; but is used only when the operator supervising the discharge operation notes the need therefor.

This integrator apparatus, which is diagrammatically shown in Fig. 1 by the number 117, comprises, in the embodiment illustrated, a plurality of ten identical devices operating in parallel, each having the duty of adding a match to a cell 100 during that interval of time in which the transporter chain is stationary between one advance and the next, as illustrated.

Figure 17:
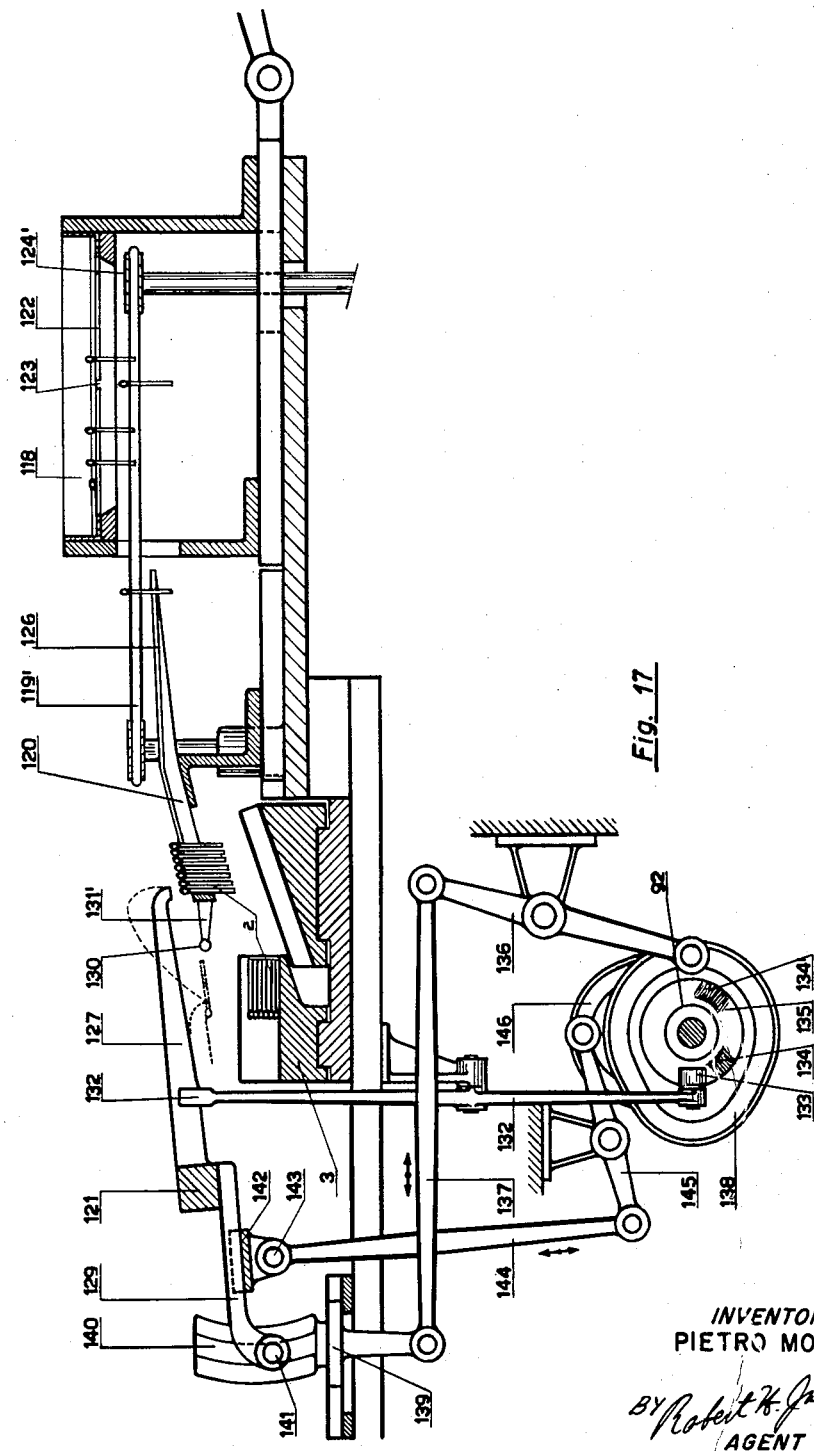
Fig. 17 is a diagrammatic view in section of the device for completing the number of matches to be boxed.

Each device 117 (Figs. 17 and 18), is made up of a loading hopper 118, a pair of conveyor belts of the endless type 119—119' for the individual movement forward of the matches, a match carrier guide 120 which is inclined for the individual setting of the matches at the gripping point and a mechanical pincer grip 121 to take one match at a time and to put it into a cell 100.

The loading hopper 118, vibrated by a suitable mechanical device, comprises a rectangular box on whose slightly inclined bottom a central longitudinal slit 122 is provided. Slit 122 is wider than the diameter of a match shank but less than the diameter of the match head. The matches $b$ due to the vibrations, penetrate shank first through slit 122.

In the center of this slit 122 is a hole 123, whose diameter is slightly larger than that of a match head, through which all the matches in the slit 122 have to eventually pass, in turn, and fall through.

Figure 18:
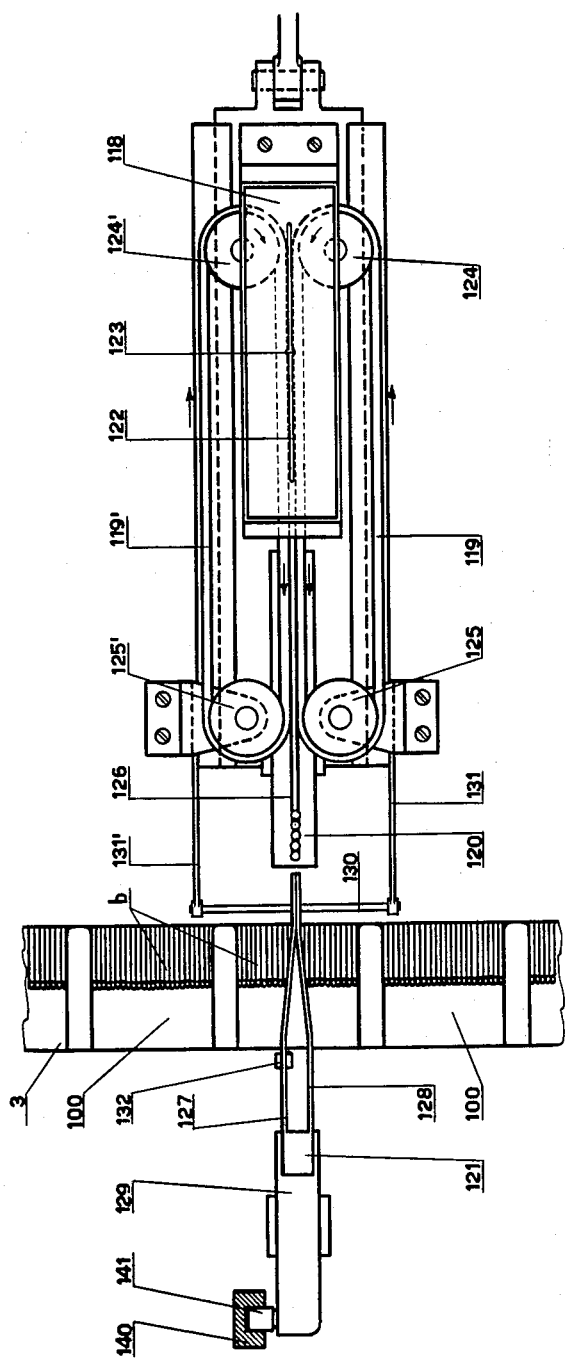
Fig. 18 is a diagrammatic plan view of the device illustated in Fig. 17.

Then the matches are immediately collected within the adjacent unidirectional ways of the endless conveyor belts 119—119' (Fig. 18). These belts are of a V shaped type or the like running on driven pulleys 124—124' and on idle pulleys 125—125'. The adjacent ways of the belts 119—119' have a diameter slightly greater than the shank diameter, but slightly less than the head diameter, due to which the matches, having their shanks sunk into these ways remain hanging by their heads and are carried forward and delivered at the slit 126 of the inclined match guide carrier 120.

The slit 126 on the guide 120 is similar to that of the hopper 118 (less the hole). Thus the matches remain hanging by their heads. Since the guide 120 is subjected to a very light vibratory movement from the hopper 118 and is inclined, the matches are gradually brought to arrange themselves in line on the lower extremity of the slit 126 where the mechanical pincer grip 121 picks them up.

The mechanical pincer grip 121 (Fig. 18) operates by means of a pair of thin arms 127 and 128, the first being mobile and the second fixed. In the rest position the ends of the arms 127 and 128 are closed.

The pincer grip 121 (Fig. 17) is fixed solid to a pincer carrier link 129 which is mobile and is mounted in such a way as to take vertical movement upwards and a horizontal to and fro motion. The component of these movements determines the curved path which the gripping ends of the two arms 127—128 of the pincer follow to bring them above the first match on the guide 120, and after having gripped it by the head, to extract it from the slit 126, move it over the heap of matches in a cell 100 on the chain conveyor 3 and then release it to fall in cell 100 in alignment with the other matches.

While the match hangs from the point of the gripping arms 127—128 of the pincer 121, the lower end of the shank strikes against a small horizontal bar 130 arranged between the arms 131—131', so that the match, being held at the lower end by the bar 130, assumes an almost horizontal position at the moment it drops from the pincers 121.

The opening of the pincer arms 127—128 is determined by the link 132 which, with the upper end terminating in a small fork, embraces the thin arm 127. The lower end of link 132 is operated, through the roller 133, by the projections 134—134' on the cam 135 on whose face the roller 133 runs. At each impulse given by the projections 134—134' the upper end of the link 132 presses crossways against the arm 127, thus causing its point to get clear from that of the fixed arm 128. This occurs at the moment when a match is lifted from the guide 120 and at the moment when it is to be let fall into the cell 100. During the evolution of the pincer 121 along its travel, the thin arm 127 can slide freely into the forked end of the link 132.

The horizontal thrust required for bringing about the evolution above described at the pincer point 121 is obtained from the link system 136—137, driven off grooved cams 138. Cams 138 determine the shift of the slide 139 within the horizontal guides. On the slide 139 a guide 140 is secured for the curved path in which slides the roller 141, which is mounted at one end of the link 129 carrying the pincer.

Simultaneously, the link 129 carrying the pincer is held by and can slide in the guide 142 which is connected through the pivot 143 to the link system 144—145, the latter, being driven by grooved cams 146, determining the vertical shift of the pincer 121. It is evident that the link carrying the pincer 129, being pushed vertically by the link 144 and horizontally by the link 137 according to different predetermined variable speeds, is able to follow the component of these thrusts. In effect it can in any moment take up a different position as it can turn around the pivot 143 and turn and slide with the roller 141 in the curved guide 140, in such a manner as to give the pincer point the desired path of movement.

The cams 138 and 146 are mounted on the shaft 92 and suitably shaped so that the operation of dropping the match in the small cell 100 from the pincer 121 occurs in the rest period between one feed forward and the next of the match conveyor chain 3.

The insertion of the matches into the boxes (Fig. 1) is done by a boxing apparatus 146. Ten groups of matches carried by the conveyor chain 3 are discharged into ten boxes already open and brought up by the chain 4 in the section of the machine in which the two chains are adjacent.

The conveyor chain 4 carrying the boxes, in the embodiment illustrated, is made up of a succession of links each link having a place for five boxes. The length and spacing of each link is exactly equal to that of the links of the chain 3. The chain 4 is made to feed forward by the hexagonal wheels 147—147' connected by suitable mechanical means to the hexagonal wheel 101. Wheel 101 drives the two links of the chain carrying the matches simultaneously with a similar corresponding movement of two links of the chain 4. This feed, like in the case of the transporter chain 3, is intermittent, that is it has a period of rest between one forward movement and the next.

All the operations carried out along the travel of the chain 4 are done by tenfold devices, that is they operate in parallel on ten boxes simultaneously.

The boxes used in the preferred embodiment are those of thin cardboard consisting of an external casing and a small drawer having a lug which is pulled for extraction from the outer housing. Stops are provided to prevent complete extraction of the drawer from the outside casing and a small back tipping flap is utilized for the insertion and extraction of the matches. It is however, possible without departing from the scope of the invention, to use cases made of wood or thin cardboard of the type used for the safety matches called "Swedish type" by slightly modifying the parts provided for handling the boxes.

Figure 19:
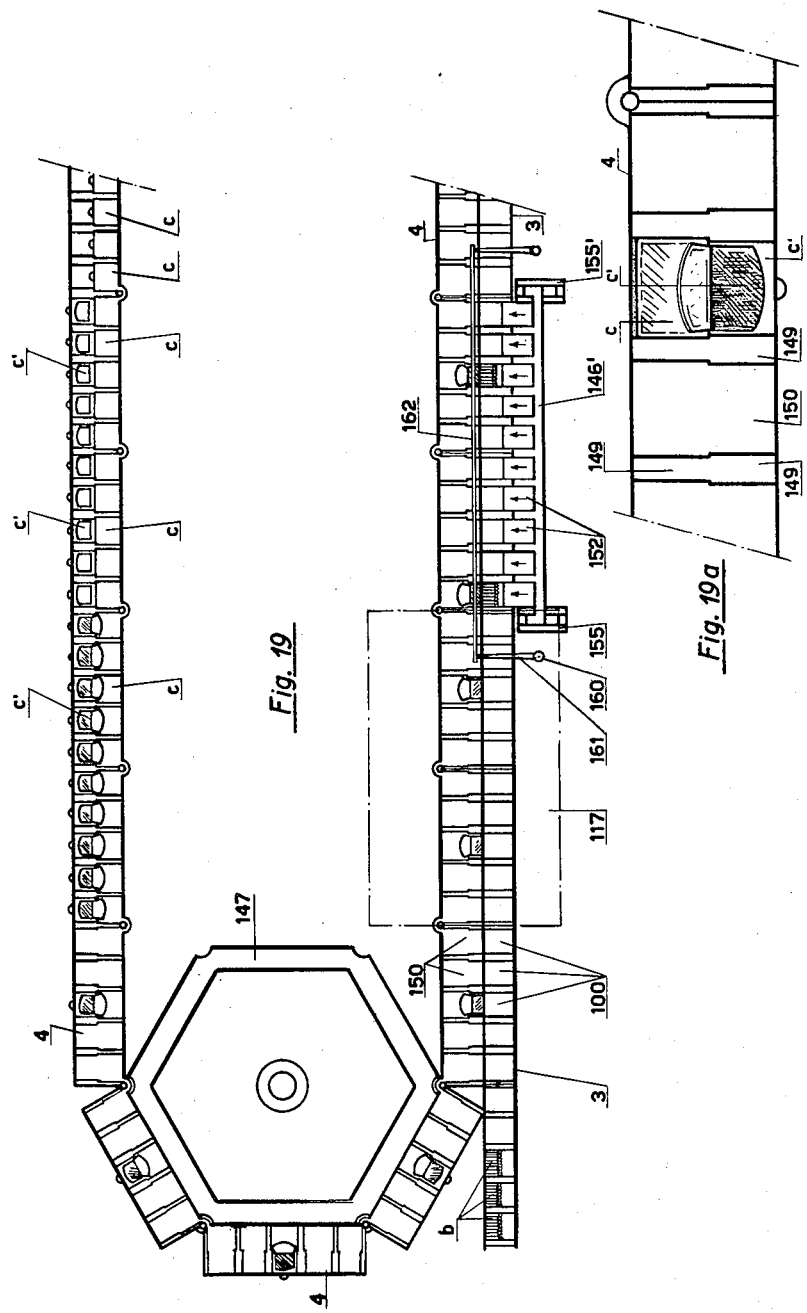
Fig. 19 is a diagrammatic partial plan view of the chain carrying the boxes and the boxing device.
Figures 20, 20A:
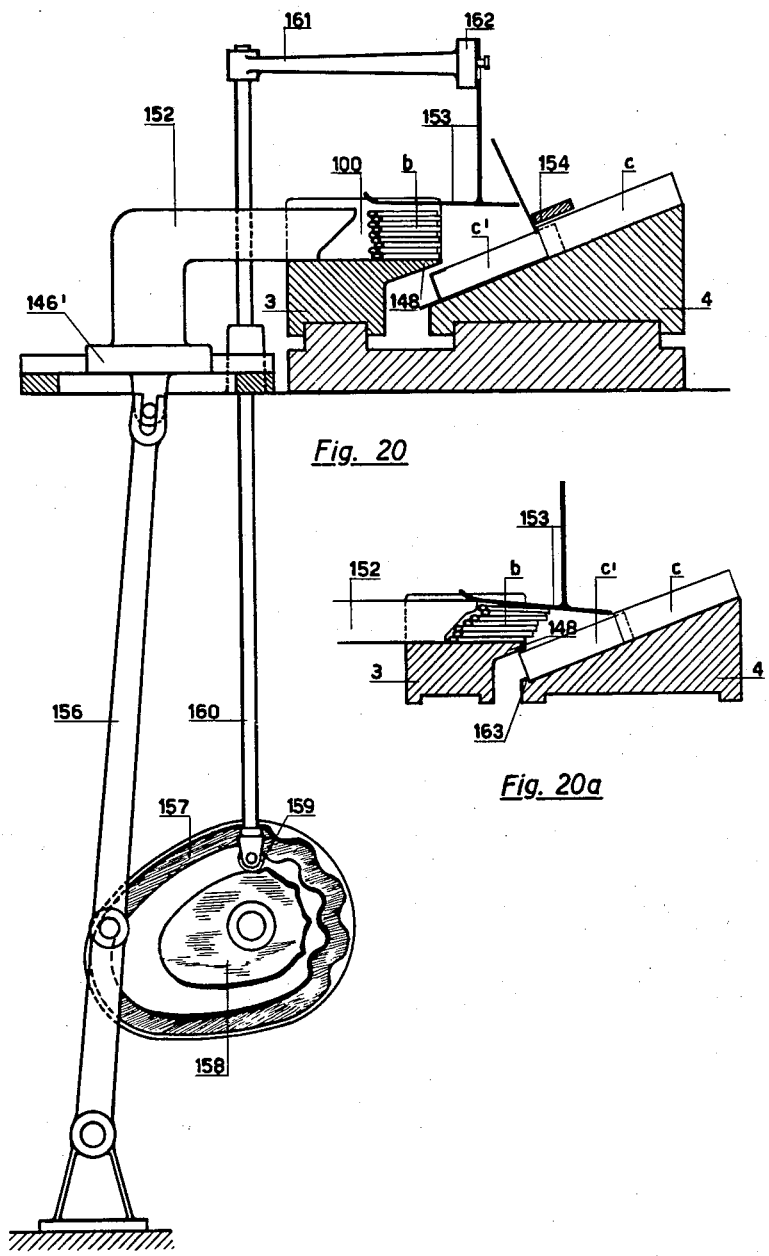
Fig. 20 is a diagrammatic sectional view of the mechanisms which place the matches in the boxes according to a preferred embodiment.
Fig. 20a is a diagrammatic modification of some devices shown in Fig. 20.

The links of the chain 4 (Fig. 19) are characterized in that the partitions 150 for housing the boxes are bounded by lateral divisions 149 (Fig. 19a) with walls which are so shaped as to hold (for example, with a small step) the external casing c. Further the plane supporting the box is sensibly inclined (Fig. 20) towards the nearby match conveyor chain 3, in such a reciprocal position that the horizontal plane of the match conveyor chain 3 finds itself slightly above the entry cut in the drawers c' of the box for the insertion of the matches. To that end the chain links are formed with a lip 148 projecting above the conveyor chain 4, which serves to present the matches b immediately above the edge of the opening cut in the drawer c'.

The loading of the closed boxes takes place at station 150 (Fig. 19) within hoppers of normal construction. Before reaching the boxing apparatus 146, the closed boxes, if of the thin cardboard type, are opened for almost total extraction of the drawer from its external casing and for opening of its back tipping flap. If the boxes are of the "Swedish" type, one single operation is enough for partial extraction of the drawer.

Essentially, the boxing or insertion of groups of matches b into the boxes c or drawers c' of boxes c is done by the simultaneous pushing of the 10 groups of matches being handled by the ten pushers 152 secured to the pusher bar 146'. Naturally the advance feed of the pushers 152 occurs at that moment when the conveyor chain 3 and the conveyor chain 4 are stationary in the interval between one move forward and the next.

The pushers 152 (Fig. 20) comprise a parallel sided block having a width which is similar to the width of the small cells. The ends of pushers 152 are arranged to come into contact with the matches b' so as to push them into the drawer c'. The nose ends of pushers 152 are so shaped that they push first the matches in the upper layers a short distance ahead, whereby these matches entering first into the box are able to control the entry of the matches in the lower layers.

At the moment of insertion of the matches into the box, they are guided laterally by the dividing walls which bound the sides of the cells 100 and on the top by a mobile pressure foot 153 formed in the shape of a letter L as well as by the back tipping flap of the drawer c' which is held in the correct position by a fixed stop bar 154.

In order to further facilitate the insertion of the matches and to assure their uniform distribution and arrangement in the drawer c', both the pusher 152 and the pressure foot 153 have a slight vibratory movement during their forward and lowering motion, respectively.

The bar 146' carrying the pushers 152 slides at the ends of the guides 155—155' (Fig. 19) and is connected (Fig. 20) to the link 156 driven off the grooved cam 157. This cam 157 is so grooved as to give at the exact moment the predetermined feed forward of pushers 152 and also a slight vibration which helps the orderly entry and arrangement of the matches in the drawer.

In the same way, the pressure foot 153, which in the lower part is inclined and formed so that one end rides over the pusher 152 whilst the other end comes over the opening or entry of the drawer c', almost to the point of entering it, is driven by the specially shaped cam 158 through a small roller 159, rod 160, arm 161 and the pressure foot carrier bar 162. The combined vibratory movement of the pusher 152 and the pressure foot 153 helps the uniform arrangement of the matches in the inside of the drawer c'. On the pressure foot carrier bar 162 ten pressure feet 153 are mounted. Having completed the boxing operation, the filled boxes of matches carried by the conveyor chain 4 (Fig. 1) are passed through various mechanical devices, not here described, which close back tipping flaps, push the drawers back into the external casings, apply a revenue stamp or seal, and then collect the boxes in an orderly manner on a discharge table 164 ready to be packed or cased.

For the boxing of the "Swedish type matches" (Fig. 20a) the principle remains the same. Since in this case the boxes are generally thicker than the box type described, it is necessary that the elements or chain links of the chains 3 and 4 take up a different mutual position, that is, the projecting lip 148 of the conveyor chain 3 is further spaced vertically from the chain 4 to adjust for the greater thickness of the drawer c'. Moreover, since in this case the drawer c' would have a tendency to slip out of the external part c, a small step 163 is provided on the inclined surface of chain 4 where the box rests to hold the external portion c from sliding down.

The insertion of the matches in boxes and the mechanism to effect this are the same as above described, with the advantage that the matches, contrary to what usually happens in the boxing stage of "Swedish Matches," are inserted into the boxes shanks first.

I claim:

1. An automatic and continuously operating machine for manufacturing thread-like shank matches comprising a frame, a plurality of groups of idle supporting rollers mounted on said frame, a plurality of independent supply drums, each of said groups of rollers rotatably supporting a different one of said drums along substantially one half of the outer periphery of said drums thereby removably mounting said drums so that each may be quickly replaced, said drums each being adapted to carry a supply of waxed thread to be fed therefrom, an uncoiler drum mounted on said frame for removing and retaining separated the threads from said drums, a pair of cooperating power driven feeder drums mounted on said frame for feeding the threads from said uncoiler drum to a plurality of shank holder blocks, a first power driven endless conveyor, a plurality of shank holder blocks mounted on said first conveyor, said blocks each comprising a rectangular bar actuated by said first conveyor, said bars each defining a plurality of apertures extending therethrough, spring means mounted within said apertures for gripping the shanks of the threads, means for cutting the threads fed from said uncoiler drum into shanks of predetermined lengths and loading the shanks into said blocks one in each of said apertures, a shank tip heading device mounted adjacent said first conveyor for acting on the shank tips to form match heads, means for turning said blocks and the shanks to shape each match head, a drying chamber mounted adjacent said first conveyor for receiving said blocks for drying the shank tips, and means for discharging the matches formed from the shanks from said blocks onto a second power driven conveyor.

2. An automatic and continuously operating machine for manufacturing thread-like shank matches comprising a frame, a plurality of groups of idle supporting rollers mounted on said frame, a plurality of independent supply drums, each of said groups of rollers rotatably supporting a different one of said drums along substantially one half of the outer periphery of said drums thereby removably mounting said drums so that each may be quickly replaced, said drums each being adapted to carry a supply of waxed thread to be fed therefrom, an uncoiler drum mounted on said frame for removing and separating the threads from said drums, a pair of cooperating power driven feeder drums mounted on said frame for feeding the threads from said uncoiler drum to a plurality of shank holder blocks, a power driven endless conveyor, a plurality of shank holder blocks mounted on said conveyor, said blocks each comprising a rectangular bar actuated by said conveyor, said bars each defining a plurality of apertures extending therethrough, said apertures being arranged in groups along longitudinal mutually spaced rows, a flat leaf spring mounted within each of said apertures for gripping the shanks of the threads, means for cutting the threads fed from said uncoiler drum into shanks of predetermined lengths and loading the shanks into said blocks one in each of said apertures, a shank tip heading device mounted adjacent said conveyor for acting on the shank tips to form match heads, means for turning said blocks and the shanks to shape each match head, a drying chamber mounted adjacent said conveyor for receiving said blocks for drying the shank tips, and means for discharging the matches formed from the shanks from said blocks in groups.

3. The combination as set forth in claim 2 in further combination with means for actuating said conveyor uniformly over the length of its path except in those sections where the shanks are loaded into said blocks, said blocks are turned, and the matches are discharged from said blocks.

4. The combination as set forth in claim 2 in further combination with a collector drum arranged on said frame between said drums and said uncoiler drum for guiding the threads.

5. An automatic and continuously operating machine for manufacturing thread-like shank matches comprising a frame, a plurality of drums rotatably mounted on said frame, said drums each feeding a waxed thread therefrom, an uncoiler drum mounted on said frame for removing and separating the threads from said drums, a pair of power driven feeder drums mounted on said frame for feeding the threads from said uncoiler drum to a plurality of shank holder blocks, a power driven endless conveyor, a plurality of shank holder blocks mounted on said conveyor, said blocks each comprising a rectangular bar actuated by said conveyor, said bars each defining a plurality of apertures extending therethrough, said apertures being arranged in groups in equally spaced rows, spring means mounted within each of said apertures for gripping the shanks of the threads, means for loading the shanks into said blocks one in each of said apertures, said loading means comprising a pair of large rollers for intermittent feed of the threads, a pair of small rollers for feeding in forward jerks the threads into a thread guide plate and into said apertures, means for cutting the threads fed from said guide plate into shanks of predetermined length before insertion into said apertures, a shank tip heading device for acting on the shank tips to form match heads, means for turning said blocks and the shanks to shape each match head, a drying chamber mounted adjacent said conveyor for receiving said blocks for drying the shank tips, and means for discharging the matches formed from the shanks from said blocks.

6. The combination as set forth in claim 5 wherein said large rollers for the forward intermittent feed of the thread comprises an idle rubber coated roller and a fluted metallic roller, said metallic roller being driven forward in jerks which feeds the thread forward the length of one shank.

7. An automatic and continuously operating machine for manufacturing thread-like shank matches comprising a frame, a plurality of drums rotatably mounted on said frame, said drums each feeding a waxed thread therefrom, an uncoiler drum mounted on said frame for removing the threads from said drums, a pair of power driven feeder drums mounted on said frame for feeding the threads from said uncoiler drum to a plurality of shank holder blocks, a power driven endless conveyor, a plurality of shank holder blocks mounted on said conveyor, said blocks each comprising a rectangular bar actuated by said conveyor, said bars each defining a plurality of apertures extending therethrough, said apertures being arranged in groups in equally spaced rows, spring means mounted within each of said apertures for gripping the shanks of the threads, means for cutting the threads fed from said uncoiler drum into shanks of predetermined length and loading the shanks into said blocks one in each of said apertures, a shank tip heading device mounted adjacent said conveyor for acting on the shank tips to form match heads, means for turning said blocks and the shanks to shape each match head, said turning means comprising a pair of rotatably mounted discs, each of said discs having diametrically opposed parallelly arranged slits so positioned to lie on the same level, said slits being arranged to receive said blocks from said conveyor, each of said discs sequentially rotating said blocks 180 degrees, a drying chamber mounted adjacent said conveyor for receiving said blocks for drying the shank tips, and means for discharging the matches formed from the shanks from said blocks.

8. The combination as set forth in claim 7 in further combination with means for causing the 180 degree rotated blocks of said first disc to move into slot in said second disc and upon rotation of said second disc 180 degrees replacing said blocks on said conveyor.

References Cited in the file of this patent

UNITED STATES PATENTS

| 415,934 | Young | Nov. 26, 1889 |
| 538,888 | Young | May 7, 1895 |
| 559,759 | Steber | May 5, 1896 |

(Other references on following page)

UNITED STATES PATENTS

| Number | Name | Date |
|---|---|---|
| 573,802 | Abbott | Dec. 22, 1896 |
| 604,565 | Lagerman | May 24, 1898 |
| 643,047 | Eisenhart | Feb. 6, 1900 |
| 673,243 | Criswell | Apr. 30, 1901 |
| 803,538 | Barnes | Nov. 7, 1905 |
| 834,620 | Hutchinson | Oct. 30, 1906 |
| 837,583 | Paridon | Dec. 4, 1906 |
| 884,506 | Larn | Apr. 14, 1908 |
| 1,002,827 | Dininny | Sept. 12, 1911 |
| 1,168,310 | Kelley | Jan. 18, 1916 |
| 1,515,824 | Best | Nov. 18, 1924 |
| 1,769,914 | Bogslowsky | July 8, 1930 |
| 1,902,611 | Blackman et al. | Mar. 21, 1933 |
| 2,201,343 | Moore | May 21, 1940 |
| 2,551,646 | Stanley et al. | May 8, 1951 |

FOREIGN PATENTS

| Number | Country | Date |
|---|---|---|
| 288,620 | Great Britain | Mar. 8, 1929 |
| 82,233 | Sweden | Dec. 18, 1934 |